United States Patent [19]
Li et al.

[11] Patent Number: 5,363,660
[45] Date of Patent: Nov. 15, 1994

[54] ORBITAL TYPE FREEZING APPARATUS AND METHOD

[75] Inventors: Yao-Tzu Li, Lincoln, Mass.; Albert P. Yundt, Jr., Nashua, N.H.; I-Chieng Ho, Concord; Henry Huang, Brighton, both of Mass.

[73] Assignee: Y. T. Li Engineering, Inc., Acton, Mass.

[21] Appl. No.: 81,499

[22] Filed: Jun. 22, 1993

Related U.S. Application Data

[63] Continuation-in-part of Ser. No. 716,083, Jun. 17, 1991, Pat. No. 5,221,439.

[51] Int. Cl.⁵ .................................................. F25C 5/12
[52] U.S. Cl. ............................................ 62/71; 62/354
[58] Field of Search ............................ 62/71, 345, 354

[56] References Cited

U.S. PATENT DOCUMENTS

| | | | |
|---|---|---|---|
| 3,049,895 | 8/1962 | Larson et al. | 62/354 |
| 3,190,817 | 6/1965 | Neugebauer et al. | 202/236 |
| 3,328,972 | 7/1967 | Svanoe | 62/123 |
| 3,498,081 | 3/1970 | Benesh | 62/354 X |
| 4,230,529 | 10/1980 | Li | 202/175 |
| 4,441,963 | 4/1984 | Li | 202/172 |
| 4,468,930 | 9/1984 | Johnson | 62/71 |
| 4,551,159 | 11/1985 | Goldstein | 62/541 |
| 4,618,399 | 10/1986 | Li | 159/6.2 |
| 4,762,592 | 8/1988 | Li | 202/172 |
| 4,796,441 | 1/1989 | Goldstein | 62/354 |
| 4,907,415 | 3/1990 | Stewart, Jr. et al. | 62/66 |

OTHER PUBLICATIONS

Electric Power Research Institute Journal, "Cool Storage: Saving Money and Energy", Jul./Aug. 1992, pp. 14-21.
Product Brochure of Turbo Refrigerating Company, Thermal Energy Storage, HP Series/IGC Series, pp. 1-12.
Product Brochure of Calmac Manufacturing Corporation, "An Introduction to Off-Peak Air Conditioning OPAC For Commercial Applications", pp. 1-8.
Product Brochure of Carrier, "Encapsulated Ice Storage", pp. 1-15.
Product Brochure of Abco Industries, Ltd., Fluidice ™.
Holusha, J., New York Times, "Keeping Buildings Cool With Greater Efficiency", Sep. 27, 1992.

*Primary Examiner*—William E. Tapolcai
*Attorney, Agent, or Firm*—Peter J. Manus

[57] ABSTRACT

A machine for freezing or chilling a liquid continuously to produce a slurry of the liquid and frozen crystals feeds the liquid into a vertically oriented heat transfer tube at its upper end. A refrigerant flow at the outer tube surface evaporates in a vapor/foam stream causing the liquid to freeze at the inner tube surface. A whip rod, preferably one that is free-standing, revolves over the inner surface to dislodge the frozen crystals mechanically and to distribute the liquid. An additive to the liquid such as ethylene glycol (in water) aids the dislodging. In one form, a mechanical flow guide surrounding the outer surface produces a thin, high velocity upward flow of the boiling refrigerant to increase the heat transfer. An orbital drive propels the whip rod. In one form the orbital drive includes a pair of horizontal plates coupled between the whip rod and at least one eccentric crank. In another form, the drive includes a pair of counterweights coupled rigidly to the heat transfer tube that rotate in phase synchronization by independent motors through the dynamic design characteristics of the system.

38 Claims, 7 Drawing Sheets

ORBITAL TYPE FREEZING APPARATUS AND METHOD

REFERENCE TO RELATED APPLICATIONS

This application is a continuation-in-part of U.S. Ser. No. 07/716,083 filed Jun. 17, 1991, now U.S. Pat. No. 5,221,439.

BACKGROUND OF THE INVENTION

This invention relates in general to apparatus and methods for evaporating, distilling, freezing or chilling liquids, and more specifically, to an orbital rod drive for use with a vertical heat transfer tube.

Making an ice slurry under mechanical agitation is a common practice in a wide variety of applications ranging from the manufacture of food products such as ice cream and frozen orange juice to the softening of ice on highways with salt to facilitate plowing. A particularly important application is the manufacture of ice in slurry form to be used as a cold storage. Ice slurries are also useful as refrigerants, e.g., to preserve seafood catches on a fishing vessel. Freezing and chilling apparatus and methods are also used in the manufacture of salts, the concentration of various solutions and suspensions, and the purification of water or other fluids.

Cold storage application for air conditioning systems has been urged by the utility industry as a way to transfer the power demand for cooling the air from daytime to the nighttime and thereby smooth out the overall power demand of the entire power distribution system. Freezing of water into ice would release its latent heat and hence can be an effective cold storage. Unfortunately, ice formed over a heat transfer surface tends to stick to the surface and thereby to block the heat transfer property of that surface. This has been found to be a major stumbling block for the wide use of ice for cold storage.

Currently, there are two types of cold storage systems on the market using ice. One is known as the ice harvester type, where a group of ice making machines are installed over an open storage tank. Ice formed periodically to a certain thickness is harvested into the tank by a defrosting cycle. The other one is known as the ice bank type. It employs a group of low cost heat transfer units, usually made of plastic, on which all the ice needed for cold storage accumulates continuously during each chilling cycle. In either of these two types the effectiveness of transferring the heat from the water to the refrigerant during the ice forming process is not as efficient as desired, thus increasing equipment cost.

The concept of making ice in slurry form so that the ice making machine can operate continuously without interruption and with some improved heat transfer property has been attempted in the industry by companies such as the Chicago Bridge and Iron, Inc. and more recently, by the Electric Power Research Institute ("EPRI") with their scheme publicized in the name of "slippery ice". At the present time the performance of the slippery ice cold storage system is still in the evaluation stage.

The EPRI sponsored research to develop a "slippery ice" system was reported in an article entitled "Cool Storage: Saving Money and Energy" published in the July/August 1992 issue of the EPRI Journal. In the EPRI scheme, calcium magnesium acetate, a substance similar to the chemical used for de-icing aircraft, is added to the water. According to EPRI, the use of this additive causes ice to form in the liquid pool, away from the heat exchanger surface, and results in a slushy type of substance that does not cling to metal. The advantages of the "slippery ice" for improving the economy were also reported in Sep. 27, 1992 edition of The New York Times entitled "Keeping Buildings Cool With Greater Efficiency". In this article the use of automobile antifreeze in the water to be frozen was reported to be unsatisfactory because it tends to lower the freezing point too much.

The slippery-ice concept is attractive because it causes an ice slurry to flow down a chilling surface under the influence of gravity only, without mechanical aid. While slippery ice works, how it works is not known. Moreover, this approach has several significant drawbacks. First, only one known additive lets ice overcome the initial stickiness barrier to a gravity feed of crystals down the chilling surface. This is of particular concern where the liquid being processed is a food product; this additive cannot be used. Another limitation is that the heat flux, wetting rate and additive concentration must be carefully controlled for the slippery ice to form. Also, the heat transfer surface must be electropolished.

One of the present applicants has produced evaporation and distillation apparatus and methods which use one or more vertically oriented heat transfer tubes (HTT's) mounted in a container and driven in an orbital motion. These apparatus are described in U.S. Pat. Nos. 4,230,529; 4,441,963; 4,618,399; and 4,762,592. The tubes are smoothed surface, circular in cross section, open at both ends, and made of a material with good heat conductivity properties. A distributor directs a feed liquid to the interior of each tube. The orbital motion spreads the liquid into a film. Heat transferred radially inward through the wall of the tube evaporates a portion of the feed liquid into a vapor stream.

Many known heat transfer apparatus use a rigid wiper bar that is positively driven to rotate within the tube to spread viscous liquids into thin, evenly distributed film. However, any rigid, positively driven wiper or scraper has drawbacks. First there is a need to introduce and seal a rotational drive shaft. Second, because the wiper or scraper is rigid and moving over a fixed surface at close spacings, manufacturing and assembly become difficult and costly. The surface must be machined to close tolerances, as well as the wiper/scraper and its support structures. Further, these rigid arrangements are susceptible to, and comparatively intolerant of, wear.

To solve these problems for low viscosity fluids, e.g. 1 to 1,000 c.p., the '399 patent describes a whip rod located in the tube which spreads the feed liquid into a highly thin and uniform film to reduce its thermal resistance and to enhance its evaporation. The whip rod also controls the build up of solid residue of evaporation. The '399 patent discloses several arrangements for mounting the rod, including lengths of cables, a flexible, but non-rotating anchor connected between a base and the lower end of the rod, and a double universal joint also connected between the lower end of the whip rod and the base. While the whip rod is effective as a film distributor, the mounting arrangements have disadvantages. They increase the overall material, assembly and operating costs. Also, they fail. Material fatigue of flexible cables supporting the whip rods is a particular concern.

While the orbital tube approach has been used for evaporation and distillation, heretofore it has not been applied for freezing. One reason is that city water freezes to the heat transfer surface of an orbital tube evaporator and greatly reduces any performance advantages.

It is therefore a principal object of this invention to provide an apparatus and method for freezing and chilling a process fluid to produce a slurry continuously and at greatly enhanced energy efficiencies.

Another principal object is to provide these results with an apparatus that can be readily scaled up in size.

A further object is to provide a freezer and method of operation that are not limited to any one additive and which can freeze and chill a wide variety of liquids including seawater and food products.

Yet another object is to provide the foregoing advantages without requiring unfavorable restrictions of operating conditions such as heat flux, wetting rate and additive concentration.

A still further object is to provide a freezer and method of freezing with the foregoing advantages that is highly compact.

Another object is to provide the foregoing advantages while also providing favorable capital and operating costs as compared to comparable known equipment and methods.

SUMMARY OF THE INVENTION

An apparatus for freezing and chilling a liquid feeds the liquid into at least one generally vertical, open-ended heat transfer tube at its upper, inner surface. In one form an outer tube surrounds each heat transfer tube to define a refrigeration chamber. In the preferred form an upward flow of a conventional refrigerant over the outer surface of the heat transfer tube evaporates at least in part. The resulting outward radial heat flow through the heat transfer tube causes a cooling of the liquid on the inner tube surface. An additive in the liquid reduces the strength of the adherence of the crystals to the heat transfer surface. Suitable additives for water are ethylene glycol (automobile antifreeze), propylene glycol, seawater, milk, and certain inorganic salts that form anhydrous crystals. Suitable additives yield a powdery crystalline structure in the ice, as opposed to large, flat, flaky crystal structures.

A whip rod is located inside each tube. It is preferably free-standing on its lower end, supported on a horizontal plate spaced below the tube or tubes. The rod is preferably formed of stainless steel, with a circular or non-circular cross-section. It flexes to conform to the inner surface when whipped. In one form it has a low friction slider secured on its lower end and is weighted also near its lower end.

An orbital drive propels the whip rod or rods to move in an orbital motion. In one form the drive propels a shell containing the HTT and structures secured to it (a system with mass M). The whip rod is dynamically coupled to revolve in response to the orbital motion of the tube or tubes. This drive can include a plurality of force carrying members such as cables that support the shell from a fixed reference structure via a rigid coupling member such as a horizontal mounting plate. The motion is generated by at least one, and preferably a pair of counterweights rotated by independent motors in phase synchronization. To produce this phase synchronization, the distance L from the center of mass M to the center of rotation of a counterweight T exceeds $\sqrt{2}\rho$ where $\rho$ is the radius of the orbital gyration of the mass M.

In another form the HTT or HTT's are stationary, but the whip rod or rods orbit within them. In either form, each rod distributes the liquid over the inner surface and mechanically dislodges frozen crystals from the inner surface. A preferred arrangement for the positive rod drive includes a pair of vertically spaced, horizontal plates that hold the rod or rods freely in aligned openings in the plates. A set of eccentric cranks drive the plates in an orbital motion, which is coupled to the rods via the plates.

The use of these orbital plates is to transmit the orbital motion from an orbital drive mechanism to each rod so that in the extreme case all excess area on the plate can be eliminated to lighten the mass of the plate and to allow the free flow of the fluid into or out from the tubes.

In some applications the upper orbital plate can also be used to distribute the feed via the openings which hold the rods freely with clearance to allow the feed to flow through at a predetermined flow rate. In this manner the openings used to drive the rods also serve as the feed distribution nozzle with the feeds serving as the lubricant of the drive mechanism of the rod and the rod as a stirrer to prevent the clogging of the nozzle. In this arrangement the plate will be perforated only at the openings for driving the rods.

To increase the heat transfer efficiency at the outer surface of the HTT, a generally tubular flow jacket surrounds the HTT with flow openings at its upper and lower ends to set up a high speed convection flow of refrigerant vapor or vapor/foam over the outer surface. Feed water distribution to plural HTT's can include a rotating vane with plural nozzles that varies the feed as a function of radius.

These and other features and objects will be more fully understood from the following detailed description which should be read in light of the accompanying drawings.

DETAILED DESCRIPTION OF THE PREFERRED EMBODIMENTS

Figure 1:
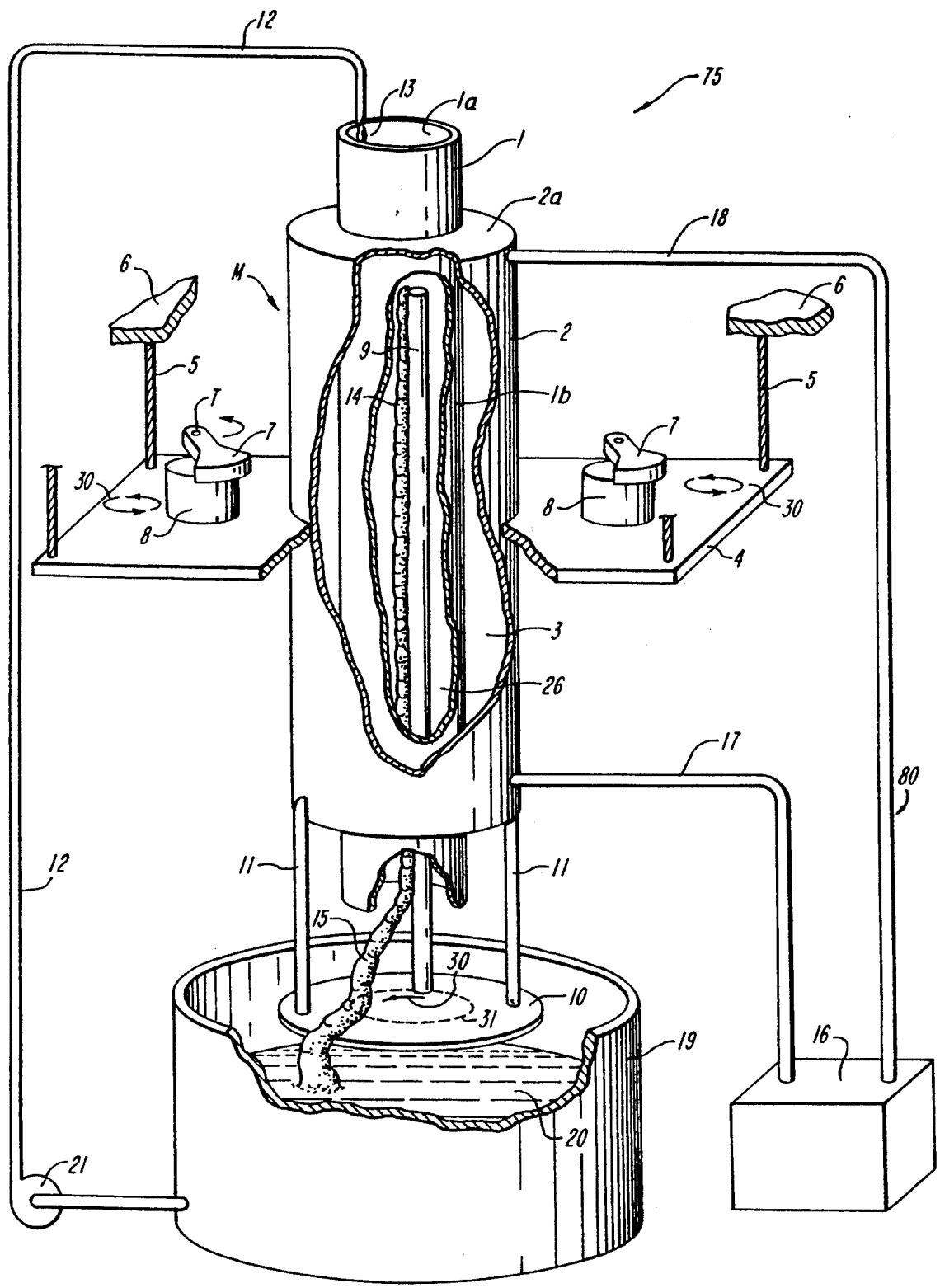
FIG. 1 is a view in perspective with portions broken away of an orbital tube freezer/chiller apparatus according to the present invention.

FIG. 1 shows an orbital tube freezer/chiller 75 according to the present invention. To facilitate the discussion, the invention will be described with reference to water as the liquid being processed to form an ice slurry 20. A generally vertically oriented, thin-walled, open-ended heat transfer tube (HTT) 1 is formed of a material with excellent heat transfer characteristics and which is also compatible with the liquid being processed and with standard refrigerants. Preferred materials for ice slurry operation with a Freon ® refrigerant include copper and steel. HTT 1 is inserted concentrically inside an outer tube 2. Annular end walls 2a at both ends seal tube 2 to HTT 1 to form an annular refrigeration chamber 3.

The assembly of the tubes 1 and 2 is rigidly secured to a horizontally extending frame 4 which is in turn attached to the lower ends of cables 5. At least three such cables will be used; four are shown. The upper ends of the cables 5 attach to a fixed reference structure 6, partially shown. In this manner, frame 4 can move freely in an orbital motion 30 in a horizontal plane determined by the frame 4 and the cables 5. (There is some slight vertical movement as the orbital motion commences or ceases, but during steady state operation the frame 4 orbits in substantially one plane.) The assembly of tubes 1 and 2 remains in a vertical alignment.

The orbital motion 30 is produced by the rotation of a pair of counterweights 7,7 which are driven to revolve synchronously by a pair of motors 8,8. Inside HTT 1 there is a free-standing whip rod 9 which is supported at its lower end on a plate 10 attached to the tube assembly by a set of rigid members 11,11. In operation, the rotation of counterweights 7,7 causes the frame 4 and tubes 1 and 2 to orbit (not rotate) in a small circle 30. This orbital motion in turn drives the whip rod 9 to revolve inside HTT 1. The lower end of the rod 9 slides on the plate 10 along a circular path 31. The mechanism of this dynamic coupling and the synchronization of the counterweights will be discussed in greater detail below.

The process liquid is introduced to the freezer/chiller 75 as a feed stream 13 from a feed tube 12 to the upper end of the inside surface 1a of the HTT 1.

As the freezer/chiller 75 revolves in the orbital motion 30, the whip rod 9 pushes the feed stream 13 into a downward flowing stream 14 that runs principally in front of the rod 9, but with a thin, generally cylindrical film 26 of the process liquid remaining on the inner surface 1a where it cools. The stream 14 discharges from the HTT 1 and flows over the plate 10 as an effluent flow 15 into a tank 19. The effluent stream carries with it frozen liquid crystals removed from the surface 1a; by the whip rod 9 to form the ice slurry 20.

A conventional refrigeration system 80 includes a compressor and condenser 16 that delivers a liquified conventional refrigerant via tube 17 to the one end (lower end as shown) of the chamber 3 which functions as the evaporator of the refrigeration system. The gasified refrigerant returns to the compressor/condenser from the opposite end (upper end as shown) of chamber 3 via tube 18. The heat of evaporation of the liquefied refrigerant is obtained from the HTT 1 by freezing the water inside the tube 1. In other words, the latent heat generated by freezing the water into ice inside tube 1 is transferred generally radially through the wall of tube 1 to its outside surface 1b to supply the latent heat for evaporating the liquefied refrigerant into vapor form. Thus, the heat transfer property of HTT 1 is essential to the efficiency of the freezer/chiller 75 in making ice, or more generally, in chilling/thickening the process liquid.

Figure 6:
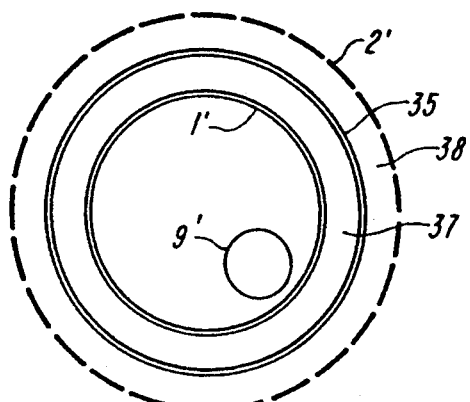
FIG. 6 is a detailed view in horizontal section of the rod, tube and jacket combination shown in FIG. 5, using a fixed jacket.
Figure 7:
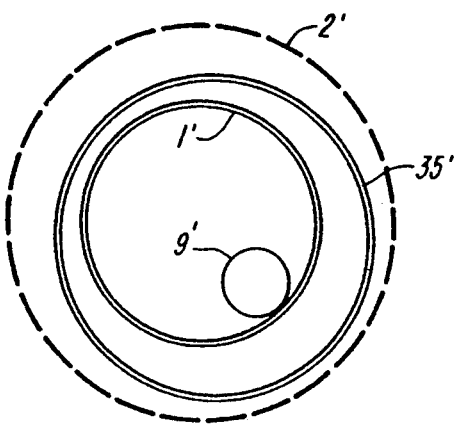
FIG. 7 is a view corresponding to FIG. 6, but with the jacket movable in response to the orbital motion.
Figure 5:
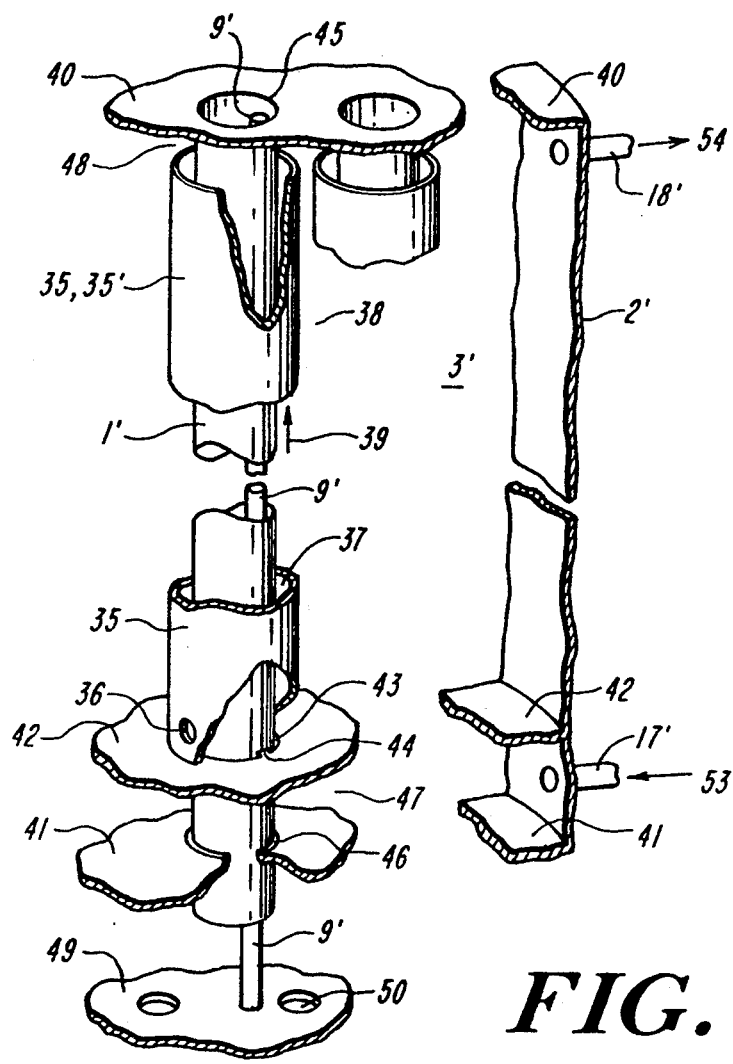
FIG. 5 is a view in perspective with portions broken away of an alternative embodiment of the freezer/chiller shown in FIG. 1 with a refrigerant flow jacket surrounding the heat exchange tube.

On the evaporation side of HTT 1, the heat transfer property is improved by maintaining a major portion of the outer tube surface 1b in a wetted condition. This is accomplished simply and effectively with a rising film or rising foam evaporator concept, as illustrated in FIGS. 5-7. A jacket tube 35 placed around the HTT 1 partitions chamber 3' into chambers 37 and 38. (Like parts in the various embodiments have the same reference number, but are distinguished by primes.) Holes 36 are formed at the lower end of jacket tube 35 and an open space 48 is provided at its upper end so that chamber 37 communicates with chamber 38. This construction promotes a convection flow between these two chambers when the refrigerant inside chamber 37 is warmer than inside chamber 38 due to the heat input from HTT or HTT's 1'.

In particular, when vapors are formed in the refrigerant in contact with the HTT 1', they further lower the average density of the liquid column in chamber 37 as compared to the average density in chamber 38. This accelerates the upward flow rate in chamber 37. In this manner this two-phase flow on the HTT 1' sweeps upwardly at a comparatively high velocity to improve the heat transfer characteristic of tube 1' by the strong shear force of this flow. This decreases the thickness of the laminar sub-layer of the liquid film which is the controlling factor of the heat transfer rate.

The dashed circle 2' in FIG. 6 represents the tube of the refrigerant chamber 3 in a single tube configuration. The outer tube defines the chamber 3 and is the outer housing for the freezer/chiller 75. In the multi-tube embodiment of FIG. 5 the outer tube or housing 2' encloses multiple HTT's and associated jacket tubes 35. It therefore functions as the outer tube 2 in FIG. 1, and as a container or housing for all of the HTT-whip rod assemblies. Only a narrow section of the housing tube 2' in a multi-tube system is shown in FIG. 5 for clarity.

The lower portion of FIG. 5 also illustrates a double sheet arrangement to provide uniform distribution of the refrigerant to each tube in a multiple tube system. In this figure, 40 is the top sheet where the upper end of the tubes are secured by welding joints 45 or other standard shop practice for such purpose. The upper end of only one adjacent tube assembly is shown, but it is representative of all other HTT's 1'. A lower sheet 41 attaches to the lower end of tube 1 at a joint 46. Sheets 40 and 41 and the container wall 2', as well as all of the tubes 1', form the refrigerant chamber 3'. An inner partition 42 is placed inside chamber 3' in parallel with the bottom tube sheet 41 to form a horizontal chamber 47. A narrow gap 43 is provided around each tube to allow the refrigerant to flow upwardly from the chamber 47 into the chamber 37 as represented by arrow 39. Protrusions 44 may be used to assure the positioning of tube 1' to maintain the proper width of the gap 43 and the even distribution of the flow of the refrigerant around every tube. An intake 53 of the liquefied refrigerant through the tube 17' into the chamber 47, then through the passage 37, is gasified enroute upwardly as the flow 39. This flow then overflows at the opening 48 into the chamber 38 (upper portion of 3'), and is finally evacuated by suction from the top of the container via the tube 18'.

FIG. 7 shows a jacket tube 35' that is not attached to the tube 1' and tube/housing 2' assembly and therefore is driven to orbit around HTT 1' in a manner similar to the whip rod.

For an orbital tube freezer, improving the refrigerant side heat transfer is more important than in an ordinary freezer because after the heat transfer coefficient of the heat transfer tube on the inner, ice side is increased by the orbital motion of the whip rod, the heat transfer resistance of the HTT 1 or 1' on the refrigerant side becomes the dominant factor limiting heat transfer. Experimental test results yielded a heat transfer coefficient over 1100 BTU/ft$^2$, °F., hr. versus 75 BTU/ft$^2$, °F., hr. for the traditional plate-type ice harvester.

In making ice slurry, a storage tank 19 is provided to collect the effluent 15, and to hold the bulk of the slurry product 20. A recirculation pump 21 propels the product from the tank 19 via the tube 12 to become the feed stream 13.

To facilitate the making of slurry, another principal feature of this invention is the use of a small amount of solute, such as conventional automobile antifreeze, added to the water stored in the tank 19. A solution of about 5% antifreeze is typical. The additive changes the crystal structure of the ice that forms on the inner surface 1a. With the additive, the ice forms as very fine crystals that have a powdery appearance, as opposed to larger crystals which have a visibly flat, flaky appearance. The fine, powdery crystals adhere less strongly to the inner surface 1a, and are more readily removed from the surface by the mechanical action of the whip rod as it rolls over the ice forming on the surface 1a, than the larger, flaky crystals. As the liquid stream 14 flows down inside tube 1, it is chilled by the refrigeration system to form ice slurry at the lower end of stream 14 which is discharged into the tank 19. The system starts with no ice; more ice slurry will be formed as the operation progresses until it reaches an ice consistency of between 50% to 70%, limited mostly by the flow of liquid slurry to the pump suction.

The nature and amount of the additive depend upon many other engineering parameters such as the shape, size and weight of the whip rod; the radius and speed of the orbital motion; the heat flux density; the flow rate of the feed; the evaporation side heat transfer coefficient, and the surface conditions of the HTT 1. Many, but not all substances promote the formation of the fine crystals needed for the orbital tube freezer/chiller ("OTF") 75 to work. Substances known to work include certain brands of automotive antifreeze, milk, calcium magnesium acetate, and certain inorganic salts such as sodium bicarbonate and those found in seawater.

Commercially available automobile antifreeze compounds are all ethylene glycol based, with approximately 95% ethylene and diethylene glycol content. Antifreeze formulations differ in the secondary additives used to prevent corrosion, limit oxidation, control foaming, and govern product appearance. Ethylene glycol is the primary additive, having the function of depressing the freezing point of the automobile radiator fluid. Diethylene glycol is an impurity present in the industrial grade of ethylene glycol used by antifreeze manufacturers.

Automobile cooling systems may contain copper, aluminum, cast iron and steel. These materials are protected from corrosion by secondary additives such as pH buffers (pH 9 works well), as well as by corrosion inhibitors (which may be specific for one material). Potassium or sodium hydroxide and phosphoric acid work well as pH buffers. Alkali borates and phosphates will protect all four materials. Sodium or potassium nitrate will protect aluminum. Various organic compounds (such as tolyltriazole) protect copper. Silicates and silicate stabilizers are also commonly added.

Antifreezes that work with the present invention promote formation of very fine ice crystals. Additives that do not work promote formation of much larger crystals having a noticeably flat appearance. Antifreeze compounds may be screened by leaving a test solution overnight in the freezing compartment of a household refrigerator. Successful antifreeze formulations form into a thick, but stirrable slush. Unsuccessful formulations form large flakes of ice and cannot be stirred. Thus far the only automobile antifreezes that are not suitable at 5% concentration are the ones manufactured by First Brands Corp. under the trade designations "Prestone ®" and "STP Heavy Duty ®" which state that they contain a patented anti-corrosive additive.

With automobile antifreeze, the freezing point depression increases with glycol concentration, so the temperature in the slush tank steadily drops as ice is formed. It is also possible to run an orbital tube freezer/chiller 75 with a constant freezing temperature by using a saturated solution of an inorganic salt. When an excess of the salt is present, the aqueous phase always contains the same (saturated) concentration of salt regardless of the amount of ice that has been formed. The freezing point depression (which depends on concentration) and hence freezing point are both constant in such cases. These so-called eutectic mixtures of salts may be useful when designing lower temperature thermal storage systems. For example, a eutectic mixture of sodium bicarbonate freezes at 27° F. Not all eutectic mixtures work. However, successful salts all formed anhydrous crystals.

Turning now to the design and operation of the whip rod 9, as the whip rod orbits over the surface 1a it pushes the stream 14 in the direction 30. This action leaves the thin film 26 behind the rod. Freezing takes place both in the turbulent flow stream of 14 and the thin film 26. Both the turbulence in the stream 14 and the thin film greatly enhance the heat transfer property of the freezing. For this reason, the whip rod 9 not only prevents ice from sticking to the tube surface 1a, but also improves the efficiency of the overall refrigeration system.

In operation, the whip rod glides over the thin fluid film 26 by a hydrofoil action and thereby minimizes the wear and the friction loss. Furthermore, the rod is driven by the motors 8,8 to revolve through the dynamic coupling of the orbital motion; it is not driven mechanically like a traditional wiper. For this reason, extreme longitudinal stiffness of the rod is not needed; it is sufficient merely that the rod be able to stand on end. In fact it should be sufficiently flexible for the rod to conform with the shape of the tube, which may not be perfectly round or straight due to manufacturing tolerances.

In an orbital type heat transfer device free revolving rods are employed so that the centrifugal force of each section of the rods along its entire length is responsible for its own prescribed function such as to create turbulence in the fluid or to prohibit the deposit of solids upon the heat transfer surface. In contrast to positively driven wiper which derives its engaging pressure through mechanical means, the orbital driven rod depends upon its own mass to produce the desirable function, and in a sense works like a whip, and is therefore called the whip rod.

Figure 2:
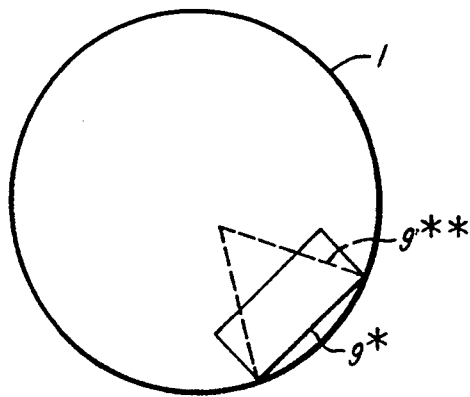
FIGS. 2-4 are each detailed views in horizontal section of the heat exchange tube shown in FIG. 1 but with whip rods of alternate cross-sections.
Figure 3:
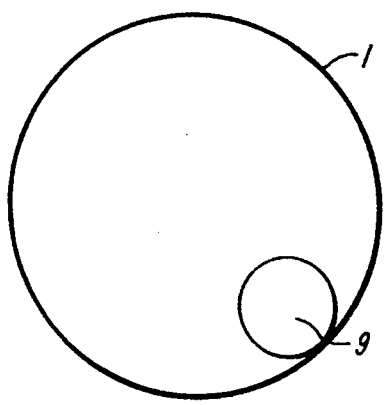
Figure 4:
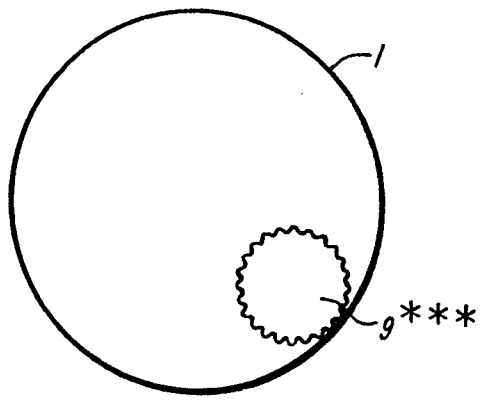

The dynamic coupling and ice removal efficiency are also functions of rod properties such as its weight, and cross-sectional configuration. To yield the necessary weight and rigidity for ice removal, steel or stainless steel are preferred materials. A four foot (1.22 m) length whip rod 9 is preferably circular in cross-section with a diameter of 154 inch (0.94 cm). In addition to the circular cross-section shown in FIGS. 1, 3 and 5-8, it is also possible to use non-circular cross-sections such as rectangular rod 9* (FIG. 2), triangular 9 (FIG. 2 in phantom), or gear shaped 9* (FIG. 4). The rectangular and triangular shapes work better at low additive concentrations than the free-rolling, round rod 9 (FIG. 3). The edges produce a chisel action. The gear shape combines features of both the circular and angled edge shapes.

Figure 5A:
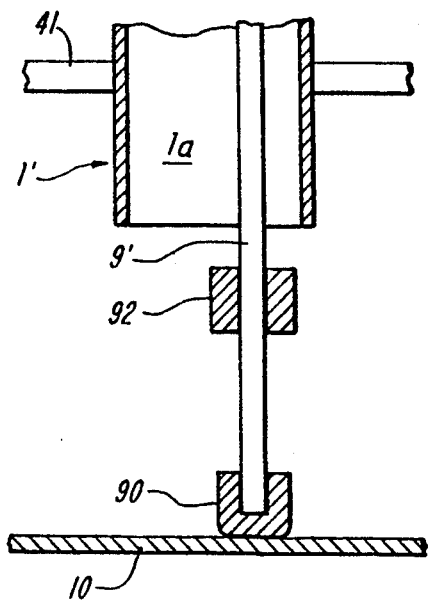
FIG. 5A is a simplified view in vertical section of an alternative whip rod for use in the FIGS. 1 or 5 embodiments that includes a slider and weight.

FIG. 5A shows an alternative whip rod design which has been found to be more effective with taller units, e.g. those with the aforementioned four foot length tubes and rods. A slider 90 of a low friction material is secured on the lower end of the rod to facilitate movement of the rod over plate 10'. A weight 92 is secured on the rod near its lower end to enhance the dynamic coupling to the orbiting tube 1'.

Because the whip rod is driven to revolve by the orbital motion of the tube, system capacity may be increased conveniently by adding more heat transfer tubes and rods, driven by the same orbital drive system, proportionally enlarged. This scaleability is a major advantage of the OTF freezer/chiller 75.

The use of a wiper and a stirrer in an old fashioned ice cream maker is a well known art. Here a strong positively engaged mechanism is employed to move the ingredient which usually has a very high viscosity such as 1,000,000 c.p. or higher. In an orbital type heat transfer device the viscosity range of the fluid to be handled are much lower such as less than 1,000 c.p. while the throughput of the fluid per tube is usually quite significant such as 1 gal/min.

The use of one or more sets of rotating counterweights to introduce an orbital motion in a heat transfer apparatus was discussed in the aforementioned U.S. Pat. No. 4,762,592. In essence, in this prior arrangement the mass center of the counterweights tends to balance against the mass of the main container, as well as all whip rods, in a 180° phase angle relationship with respect to a common orbital center. This effect is analogous to a hammer thrower leaning backwards to swing the hammer, or a male ice skater leaning backwards to swing his partner. For orbital drive with two counterweights as shown in FIG. 1 (and again in FIG. 8 for a multi-tube system), one straightforward solution would be to drive the two (or more) counterweights in synphaseous condition through various forms of mechanical coupling such as timing belts, connecting rods, gears, or an electrical servo system to make the counterweights behave like one single counterweight, with an effective common mass center revolving around the center of the main mass in the same horizontal plane.

Figure 8:
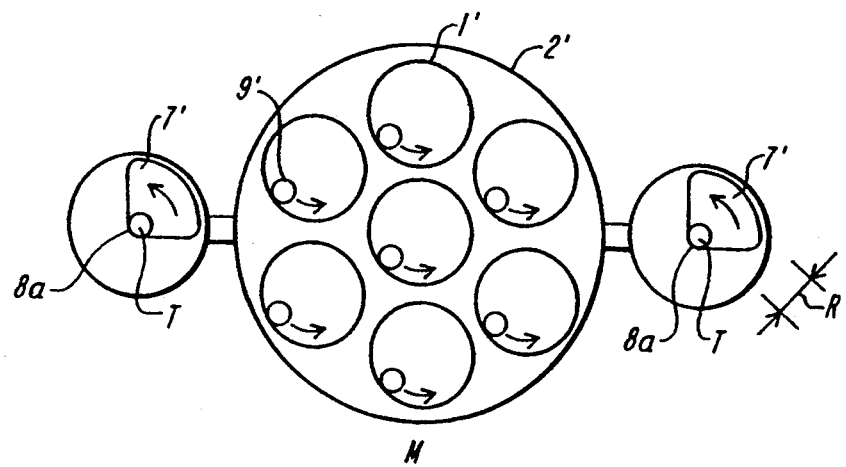
FIG. 8 is a simplified top plan view of an orbital drive for a freezer/chiller according to FIGS. 1 or 5 where the freezer/chiller uses seven heat exchange tubes and associated whip rods and the drive includes a diametrically aligned pair of rotating counterweights rigidly coupled to the freezer/chiller.

In practice it has been found, however, that the two counterweights as shown in FIG. 1 or FIG. 8 may synchronize with each other automatically in either one of two modes i.e. either a desirable 0° phase angle mode or an undesirable 180° phase angle mode, depending upon the distribution of the main mass M the container, HTT's, whip rods, and all masses rigidly coupled to them such as the frame 4, sheets 40, 41 and 42, members 11,11 and plate 10.

Indeed, all whip rods in the HTT's in the main container 2' shown in FIG. 8 are driven to revolve near the 180° phase difference with respect to the counterweights. By this logic one would think the effect of two counterweights upon each other would also follow this tendency to assume a 180° phase angle between them. In one simple case, with zero orbital motion, it is readily shown that two independently driven counterweights mounted on the same center axis would stabilize themselves at 180° apart, as in the hammer toss example given above. But for the present purposes, a zero degree phase difference is desired.

The mutual synchronization effect between two independently driven counterweights mounted symmetrically as shown in FIG. 8 falls in the general class of dynamic problems treated theoretically in a "Synchronization In Science And Technology" by I. I. Bleckhman with an English translation published by ASME Press (1988 edition, p. 78). It can be shown that satisfactory orbital drive can be obtained with two independently driven counterweights if they are positioned sufficiently apart from the center of the main mass M. Otherwise they will assume the 180° mode to cause the main mass to oscillate in a torsion mode instead of the orbital mode. More specifically, in order for the system to achieve a synphaseous running mode, it should satisfy the relationship $$L > \sqrt{2}\rho$$

where

L is the distance of the pivot of the counterweights from the system center, $\rho$ is the radius of gyration of the main mass M.

This condition checks very well with experimental results to the extent that either mode of synchronization can be maintained even with the power input of either one of the two driving motors 8,8 cut off. This condition is also quite practical. For instance in the layout of FIG. 8 the value of L is almost equal to $2\rho$ by simple design rule.

Figure 9:
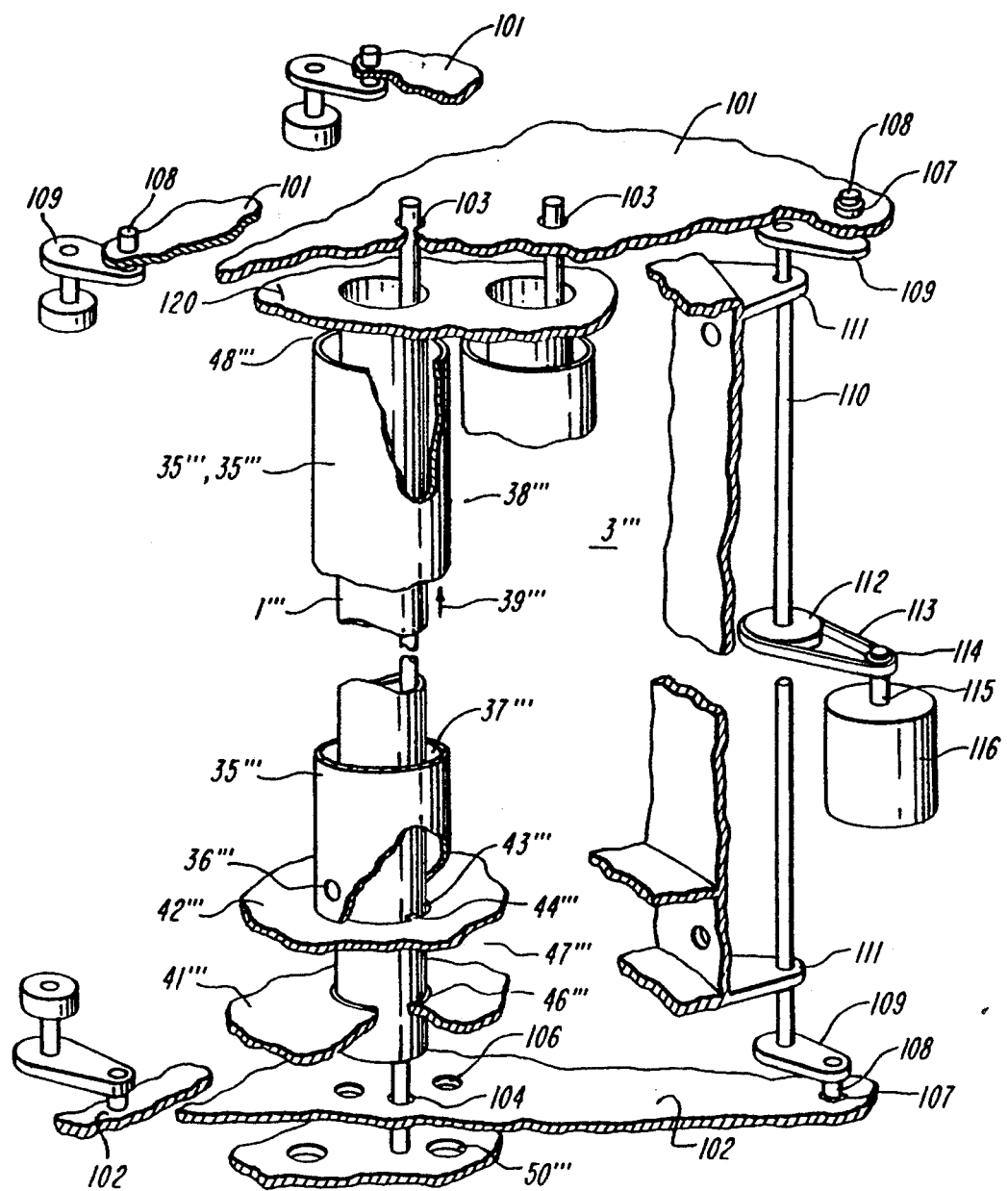
FIG. 9 is a view in perspective of a further embodiment of an orbital tube freezer/chiller according to the present invention where multiple heat exchange tubes are fixed and an orbital drive is positively coupled only to the whip rods.
Figure 9A:
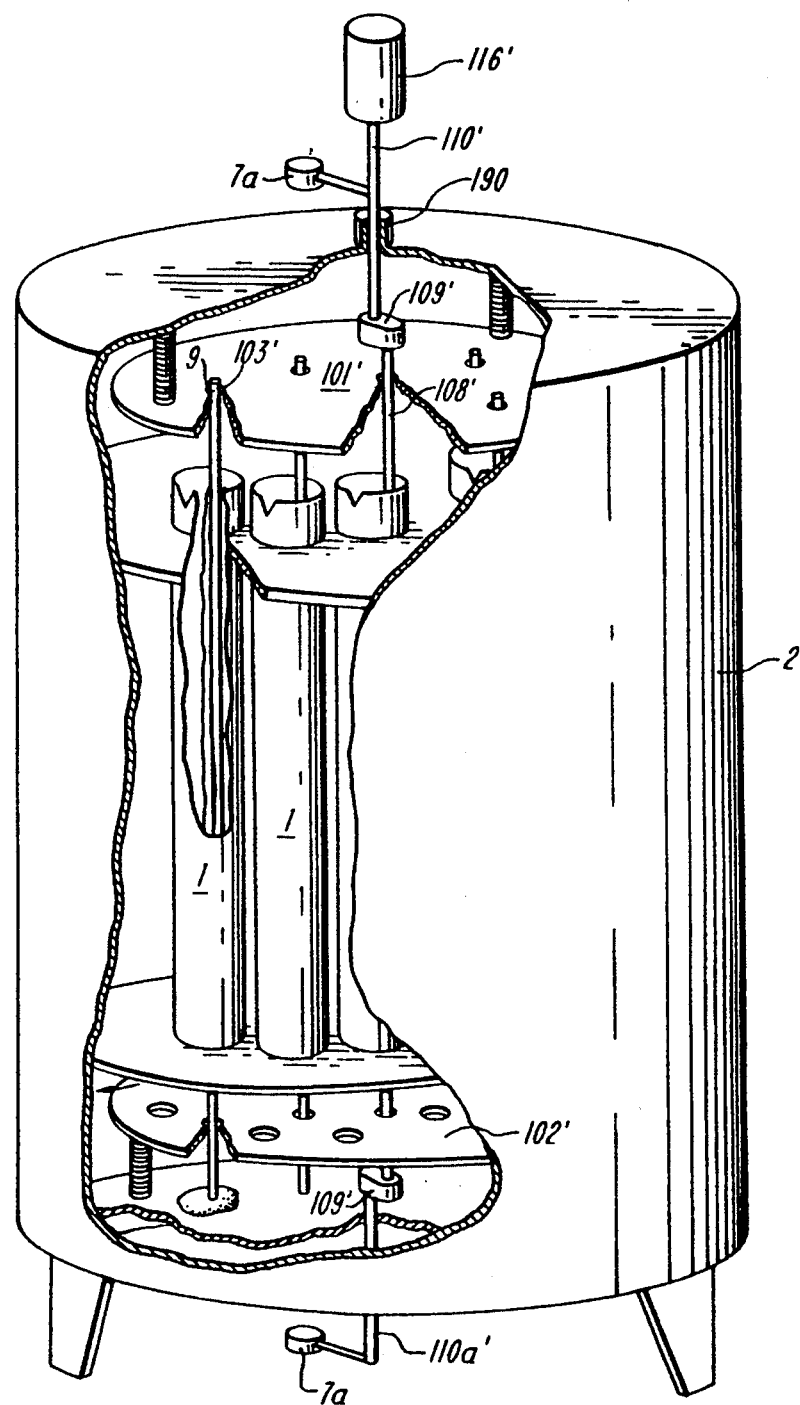
FIG. 9A is a view corresponding generally to FIG. 9 with a single drive motor located centrally over the housing.

FIG. 9 shows an alternative approach to orbital tube heat transfer system where the tube assembly is stationary while the whip rods 9 are driven in an orbital motion. In this figure, an upper orbital rod driving plate 101 and a lower orbital rod driving plate 102 each extend generally horizontally in a parallel spaced relationship. Holes 103 in the upper plate 101 engage loosely the upper ends of the rods 9. Holes 104 in the lower plate 102 similarly engage the lower ends of the rods. Plates 101 and 102 are driven into orbital motion by at least one shaft 110 acting through brackets 111,111, eccentric cranks 109,109, and crank pins 108,108 that engage bearings 107,107 secured on the plates. Two additional cranks are used in each of the upper and lower plates to duplicate as much as possible the translational motion in similar kinds of drives commonly used for orbital shakers. Shaft 110 is driven by motor 116 through pulleys 112 and 114 coupled together by a belt 113. Rotation of the motors 116 rotates the shafts 110 which drives the plates 101, 102 and the rods 9 engaged in the plates in an orbital motion. Alternatively a single motor 116' (FIG. 9A) located over the housing 1 rotates a drive shaft 110' that penetrates through an end wall of the housing in a rotary bearing 190. A counterweight 7a is mounted on the shaft. An eccentric 109' connects the drive shaft to a second shaft 108' that extends through one of the HTT's 1 to another eccentric 109' coupled to a shaft 110a' that rotates in a bearing 190 in the other housing end wall. Shaft 110a' also carries a counterweight 7a.

Figure 12:
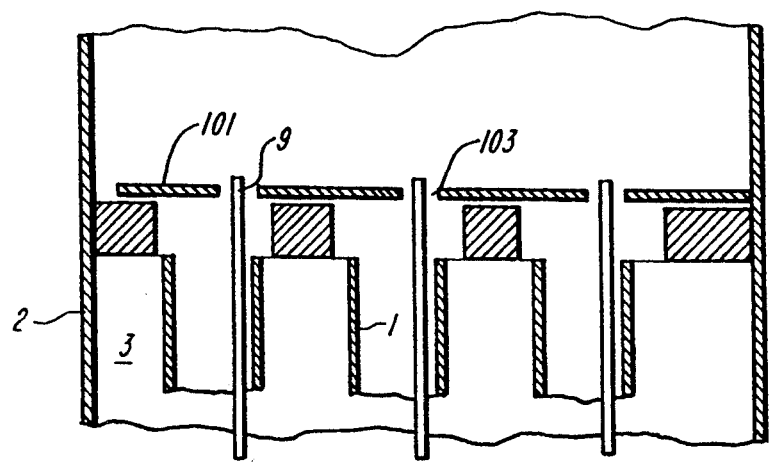
FIG. 12 is a view corresponding to FIG. 11 of an orbital drive plate and feed distribution device according to the present invention.

Feed fluid 120 is introduced to the upper plate 101. Since the tubes are stationary, the distribution of the liquid evenly over the tubes can be accomplished by traditional methods such as a weir type distributor. FIG. 12 illustrates the use of the upper orbital drive plate 101 to distribute the feed through the openings 103 used to drive the upper ends of whip rods 9. In this manner the feed serves as the lubricant for rods 9 moving inside the opening 103 and the motion of the rod 9 keeps the opening 103 from being clogged up by any solids which might be carried by the feed including the formation of ice.

The effluent discharge 15 of FIG. 11 escapes downwardly via holes 106 in the lower plate 102 located generally below each HTT 1.

In the FIGS. 1, 5, and 8 embodiments, the process fluid 14 flowing down the tube 1 is driven to revolve inside the tube through the orbital dynamic coupling even without the rod or rods. Whereas in the FIG. 9 fixed tube arrangement, the fluid inside the tube is spread primarily by the revolving rod which generates the engaging pressure by its centrifugal force while revolving inside the tube. The rod 9 is a whip rod, not a wiper rod. It is free-standing on its lower end on plate 10. It is free to assume a position vis-a-vis the associated surface 1a pursuant to the design and operational factors discussed above.

By driving the rod with a positive mechanism may appear to be cumbersome, but there are significant advantages in driving a rod, including its associated mechanisms, which weigh less than 10% of the entire freezer/chiller 75. As a result it is possible to avoid using a heavier suspension system for much heavier equipment and to eliminate the need for couplings with a large flexibility for handling the flow of the pressurized refrigerant between the moving heat transfer apparatus and the associated stationary equipment.

This fixed tube/orbiting rod embodiment is particularly well suited to applications where the inertial reference frame in which the freezer/chiller 75 is mounted moves, as on a sea-going vessel or any moving transport. One practical application is the refrigeration of seafood caught and stored on a fishing vessel.

One concern of the FIG. 9 orbital rod embodiment is that it is preferable to locate the electric motors 116 on the outside of the housing/tube 2, which then necessitates some form of seal between driving plates 101,102 and the motor. Known rotary seals of a variety of forms can be used. However, any such seal is subject to wear and failure, and it introduces an added cost.

Figure 10:
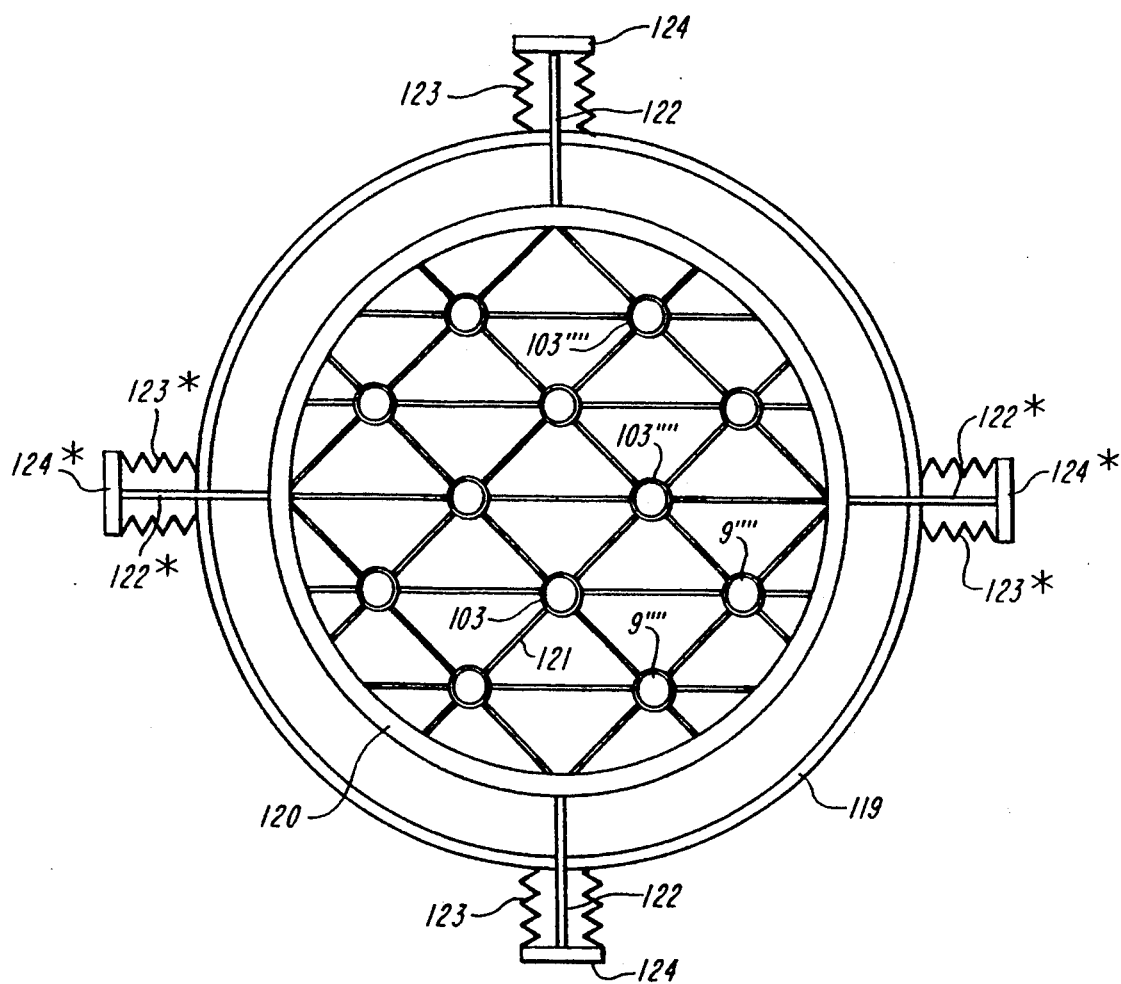
FIG. 10 is a simplified view in horizontal section of an alternative orbital-rod, fixed-tube, drive according to the present invention.

An alternative sealing and drive arrangement which does not use rotary seals is illustrated in FIG. 10. An outside shell 119 surrounds and encloses multiple heat transfer assemblies 1,2 each with an associated whip rod 9. A pair of rigid rings 120,120 each act as an orbital rod drive plate. Two sets of wires 121 and rod mounting rings 103 interconnected as shown in the form of a net transmit the orbital motion from each ring 120 to the individual whip rods. Each ring 120 is stretched between two sets of cables 122,122 and 122*,122*, driven through drive plates 124 and 124* with four bellows 123 serving as the seal. A linear oscillatory motion of the two sets of drive plates 124,124* is coordinated to produce a resultant orbital motion.

Figure 11:
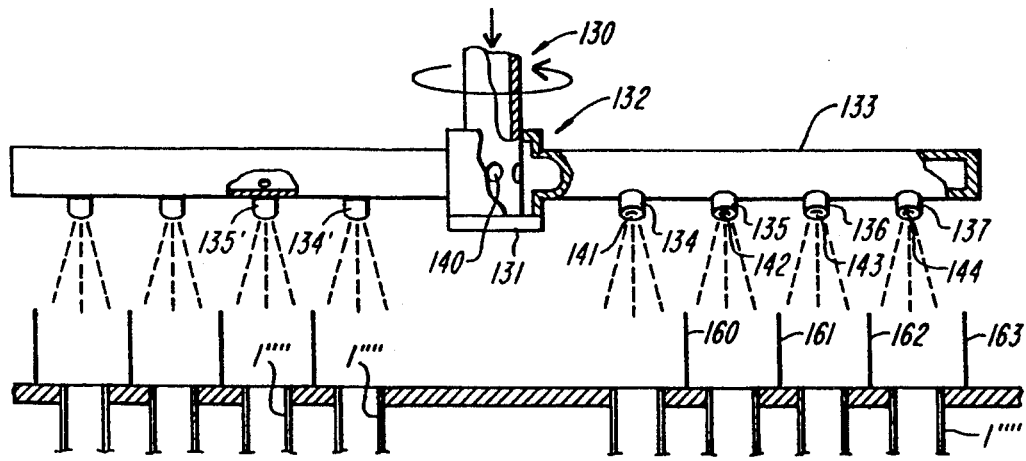
FIG. 11 is a simplified view partially in vertical section and partially in side elevation of a liquid distribution system suitable for use with the orbital drive of FIG. 8.

The FIG. 10 drive also lends itself to use with a rotating vane type fluid distributing system as shown in FIG. 11. It employs nozzles 134–137 and 134'–137' mounted on a rotating vane 133 to distribute the fluid evenly over the upper end of the HTT's 1. Fluid is introduced into a main conduit 130 with holes 140 and a thrust bearing 131 upon which the housing 132 of the rotating vane is supported. The hollow vane 133 is made of two diametrically aligned arms, as illustrated, each carrying several nozzles 134–137 and 134'–137'. Their orientation pushes the vane to rotate in a predetermined direction, like a lawn sprinkler. The orifice of the nozzles are adjusted so that for a given pressure drop the flow rate of each spray 141–144 is in ratio to its radius from the rotation center so that the flow received by each tube 1 is generally uniform. Concentric divider rings 160–163 are also provided to minimize the cross flow between annular tracks of the revolving sprays 141–144.

Viewed as a process, the present invention involves providing a heat transfer tube, orienting it generally vertically, flowing a liquid over the inner surface of the heat transfer tube, refrigerating the outer surface of the tube, and mechanically removing liquid that freezes to the inner surface by orbiting a whip rod over the surface. The process also includes adding a chemical agent to the liquid which reduces the strength of the bond between the crystals and the inner surface to facilitate the mechanical removal.

In a preferred form, the cooling is by flowing a refrigerant liquid upwardly over the outer surface so that it evaporates. It also involves producing a high speed convection flow of refrigerant and evaporated vapor over the outer surface to enhance the heat transfer coefficient. The process is also preferably continuous, with the flow exiting the tube being collected and recirculated back to the tube. The process is also scaleable, both in size and number of heat transfer tubes as by simultaneously feeding liquid to plural heat transfer tubes, collecting the effluent from the plural tubes, and recirculating it. The mechanical removing includes both 1) driving the tube or tubes in an orbital motion with the whip rod or rods driven through a dynamic coupling and 2) driving the whip rod or rods by a positive coupling, with the tube or tubes stationary. The driving process includes rotating plural counterweights rigidly secured to the tube or tubes in phase synchronization with each other and placing the counterweights at a distance L from the center of mass of the system such that L is greater than $\sqrt{2}\rho$ where $\rho$ is the radius of gyration of the system mass M. In the positively driven rod form of the invention, the orbital driving includes producing an orbital motion, coupling it mechanically to the rod or rods, and sealing the region of the orbital motion producing from the region adjacent the heat transfer tube.

By way of illustration, but not of limitation, a freezer/chiller 75 of the type shown in FIGS. 5-8 uses seven HTT's, each four feet (1.2 m) high, made of carbon steel with a wall thickness of 0.049 inch (1.24 mm) and an outside diameter of 1½ inch (3.175 cm). The whip rods are each also four feet high with a circular, ⅜ inch (0.95 cm) diameter cross-section and made of stainless steel. The additive is a 5%-10% solution of automobile antifreeze in water fed at a rate of about 1.2 gpm per tube. The orbital drive produces a ¼ inch (0.635 cm) orbital radius ($\rho$) at 380 rpm. This arrangement has proven to be able to produce ice slurry continuously with a heat transfer of more than 800 BTU/sq.ft/hr/°F., about three times better than current freezers for slippery ice and about ten times better than current plate-type ice harvesters. Even greater efficiencies should be attainable using the general orbital tube approach of this invention.

Compared to the new "slippery ice" freezers, there is a decided advantage in that only one additive is known to make the slippery ice technique work, whereas the present invention can use a wide range of additives, including seawater. Another advantage is over a two-fold improvement in heat flux—slippery ice starts to stick to the heat transfer surface when the heat flux gets too high. Another advantage is a higher freezing point, e.g. $-1.7°$ C. versus $-2.3°$ C. for slippery ice, which, depending on the ambient temperature, can translate into energy cost savings of 2% to 3%. Using higher molecular weight additives in the present invention (with corresponding increase in freezing temperature) can produce even greater savings. Slippery ice units require highly polished surfaces to keep the ice from sticking; the present invention has no such requirement. Also, the reduction in equipment size, about 2:1 orbital tube versus slippery ice and 10:1 versus known plate type ice harvesters, produces equipment cost savings, even after accounting for the extra cost of an orbital drive.

There has been described a freezing and chilling apparatus and method that produces a chilled and/or frozen slurry continuously, compactly, and with many times greater heat transfer efficiency than heretofore available. The invention is not restricted to any process liquid or any one additive. The equipment and process are readily scaleable. The equipment has no critical alignments or wear sensitive components, as with mechanical wiper systems.

While the invention has been described with respect to an upflow evaporation system, it will be understood that many arrangements can be used to withdraw heat at the outer surface of the heat transfer tube. A wide variety of arrangements can also be used to develop the desired orbital motion. An arrangement using spring loaded struts acting in combination with one or more coaxial rotating counterweights, for example, is described in U.S. Pat. No. 4,762,592. Non-mechanical drives are also possible, e.g. magnetic coupling to an orbiting element inside the freezer/chiller. Also, while the invention has focussed on the production of an ice slurry for cold storage applications, it can be used for any application where it is desired to chill or freeze a liquid, as in concentration of food products such as fruit juices. These and other modifications and variations are intended to fall within the scope of the appended claims.

What is claimed is:

1. An apparatus for freezing or chilling a liquid comprising,
    a heat transfer tube formed of a material with a high heat transfer property, oriented vertically with upper and lower ends and inner and outer surfaces, and adapted to receive the liquid to be frozen or chilled at its inner surface near its upper end,
    a housing surrounding said heat transfer tube to define therebetween a closed evaporator chamber at the outer surface of said heat transfer tube,
    refrigeration means for circulating a refrigerant through said chamber over the outer surface of said heat transfer tube where the refrigerant evaporates due to heat transferred to said refrigerant from said liquid through said heat transfer tube,
    a whip rod disposed within said heat transfer tube and,
    means for driving at least said whip rod in an orbital motion to revolve about said inner surface.

2. The freezing/chilling apparatus of claim 1 wherein said liquid flow contains a chemical agent that facilitates said mechanical removal.

3. The freezing/chilling apparatus of claim 1 wherein said chemical agent is selected from the group consisting of ethylene glycol, ethylene glycol based solutions, propylene glycol based solutions, milk, seawater, calcium magnesium acetate, and inorganic salts that form anhydrous crystals.

4. The freezing/chilling apparatus of claim 1 wherein said orbital driving means is coupled to and drives said heat transfer tube and wherein said whip rod is driven by a dynamic coupling with said orbital drive means.

5. The freezing/chilling apparatus of claim 1 wherein said heat transfer tubes are stationary and said orbital driving means drives said whip rod only.

6. The freezing/chilling apparatus of claim 1 further comprising means disposed below said heat transfer tube for collecting the liquid flow and frozen liquid exiting the tube at its lower end and means for recirculating said collected liquid flow to said heat transfer tube.

7. The freezing/chilling apparatus of claim 1 wherein said whip rod is sufficiently stiff to be free-standing within said heat transfer tube on one of its ends.

8. The freezing/chilling apparatus according to claim 7 wherein said whip rod is also sufficiently flexible to conform to irregularities in said inner surface during operation.

9. The freezing/chilling apparatus according to claim 7 wherein said whip rod has a generally circular cross section.

10. The freezing/chilling apparatus according to claim 9 wherein said whip rod has a fluted outer surface.

11. The freezing/chilling apparatus according to claim 7 wherein said whip rod has a non-circular cross section.

12. The freezing/chilling apparatus according to claim 7 wherein said whip rod includes a member secured on said lower end characterized by a low sliding friction.

13. The freezing/chilling apparatus according to claim 7 where said whip rod includes a weight secured near its lower end to facilitate said orbital motion.

14. The freezing/chilling apparatus according to claim 1 further comprising mechanical means disposed in said chamber for controlling the said refrigerant flow.

15. The freezing/chilling apparatus according to claim 14 wherein said mechanical refrigerant flow control means comprises an open-ended tubular member disposed in said chamber around said heat transfer tube to define a convection flow path for said refrigerant within said chamber.

16. The freezing/chilling apparatus according to claim 15 wherein said open-ended tubular member is fixed with respect to said heat transfer tube to produce a high velocity, annular stream of said refrigerant in a vapor/foam state over the outer surface of said heat transfer tube.

17. The freezing/chilling apparatus of claim 15 wherein said open-ended tubular member is free to revolve about said heat transfer tube in response to said orbital driving.

18. The freezing/chilling apparatus according to claim 15 wherein there are plural of said heat transfer tubes each with associated ones of said open-ended tubular members.

19. The freezing/chilling apparatus of claim 18 further comprising mechanical means for distributing said refrigerant among said freezer subassemblies.

20. The freezing/chilling apparatus of claim 19 wherein said mechanical distributing means comprises top and bottom walls that extend generally horizontally between, and are sealed to, said plural heat transfer tubes to define said chamber, and a third generally horizontally extending wall spaced closely from said upper wall and annularly spaced from each of said heat transfer tubes.

21. The freezing/chilling apparatus of claim 4 wherein said orbital driving means comprises
a fixed reference member,
a support member rigidly coupled to said outer tube,
means for mounting said support member on said reference member in a manner that allows a free orbital motion of said outer tube and said heat transfer tube,
counterweight means, and
means rigidly coupled to said support member for rotating said counterweight in a generally horizontal plane.

22. The freezing/chilling apparatus of claim 21 wherein said means for mounting comprises at least three generally vertically oriented force carrying members extending between said reference member and said support member.

23. The freezing/chilling apparatus of claim 21 wherein said counterweight means comprises a pair of coplanar counterweights and said means for rotating said counterweights comprises independent drive motors for each of said counterweights.

24. The freezing/chilling apparatus of claim 23 wherein the distance L from the center of rotation of said pair of counterweights to the center of mass M of said freezing/chilling apparatus, including all mass rigidly attached to said apparatus is greater than $\sqrt{2}\rho$ where $\rho$ is the radius of gyration of the mass M.

25. The freezing/chilling apparatus of claim 1 wherein said means for driving includes means for producing rotary motion, means for translating said rotary motion into an orbital motion, and means for coupling said orbital motion to said whip rod.

26. The freezing/chilling apparatus of claim 25 when said means for translating comprises a drive shaft and at least one eccentric crank secured to said crank shaft, and said means for coupling includes a pair of parallel, mutually spaced plates operatively connected between said eccentric crank and said whip rod.

27. The freezing/chilling apparatus according to claim 1 wherein said driving means includes means for producing an orbital motion and means for coupling said orbital motion mechanically to said whip rod.

28. The freezer/chiller apparatus according to claim 27 wherein there are plural heat exchange tubes and associated whip rod and wherein said mechanical coupling means includes at least one rigid ring surrounding said whip rods and means for rigidly interconnecting said ring and said whip rods.

29. The freezer/chiller apparatus according to claim 28 wherein said means for producing orbital motion comprises two pairs of linear actuators each actuator in the pair diametrically opposed from the other and means for sealing said actuators from said chamber.

30. A process for freezing or chilling a liquid comprising,
providing a heat exchange tube of a material with a high heat transfer property,
orienting the tube generally vertically so that it has open upper and lower ends,
introducing the liquid to the inner surface of said heat transfer tube at its upper end so that it flows downwardly along the inner surface of said heat exchange tube,
boiling a refrigerant along the outer surface of said heat exchange tube concurrently with said downward liquid flow, whereby heat flows through the heat exchange tube from the liquid to the refrigerant which evaporates the refrigerant at least in part and cools the liquid so that it freezes, and
mechanically removing from the inner surface of the heat exchange tube liquid which has frozen or thickened by placing a whip rod in the heat exchange tube and revolving it over the inner surface of said heat exchange tube in an orbital motion, said revolving also distributing said downward liquid flow over said inner surface.

31. The process of claim 30 wherein the liquid is water and further comprising the step of adding a chemical agent to the water which facilitates said mechanical removing by producing ice with a powdery crystalline structure.

32. The process of claim 31 wherein said adding includes creating a solution of glycol in water.

33. The process of claim 31 wherein said adding includes dissolving in the liquid inorganic salts that produce anhydrous crystals on freezing.

34. The process of claim 30 further comprising the steps of collecting liquid and frozen liquid removed from the lower end of said heat exchange tube and recirculating the collected liquid to said heat exchange tube.

35. The process of claim 30 wherein said boiling includes producing a thin, high speed flow of said refrigerant in a vapor/foam phase adjacent the outer surface of said heat transfer tube.

36. The process of claim 30 wherein said revolving includes rigidly coupling a set of counterweights to said heat exchange tube and rotating the counterweights in phase synchronization.

37. The process of claim 34 wherein said rotating comprises maintaining said phase synchronization through the dynamic characteristics of mechanical elements used for said providing, introducing, boiling, driving and mechanical removing.

38. The process of claim 30 wherein said revolving includes positively mechanically driving said whip rod in an Orbital motion while holding said heat transfer tube stationary.

* * * * *